INVENTOR
Gerald L. Vaughan

BY Karl W. Flocks
ATTORNEY

INVENTOR
Gerald L. Vaughan

BY Karl W. Flocks

ATTORNEY

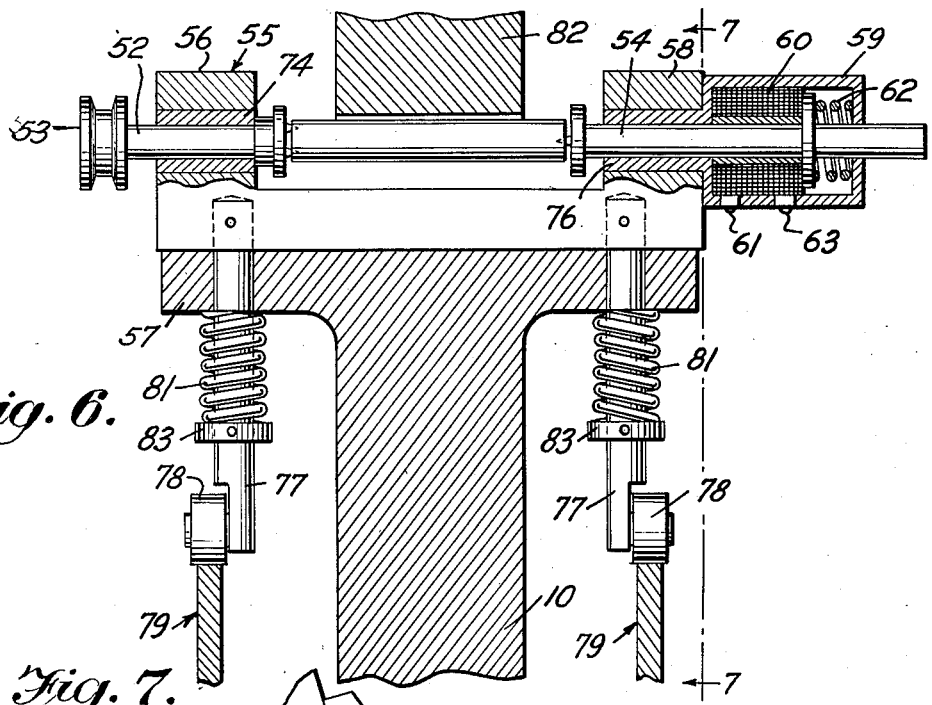
Fig. 6.
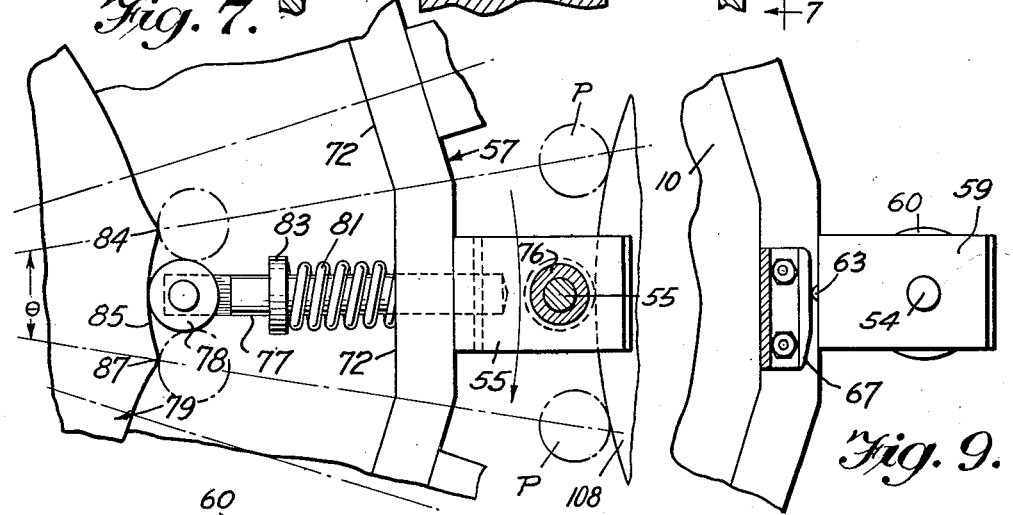
Fig. 7.
Fig. 9.
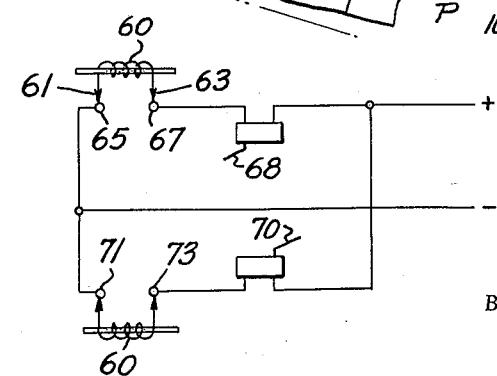
Fig. 8.
INVENTOR
Gerald L. Vaughan
BY Karl W. Flocks
ATTORNEY

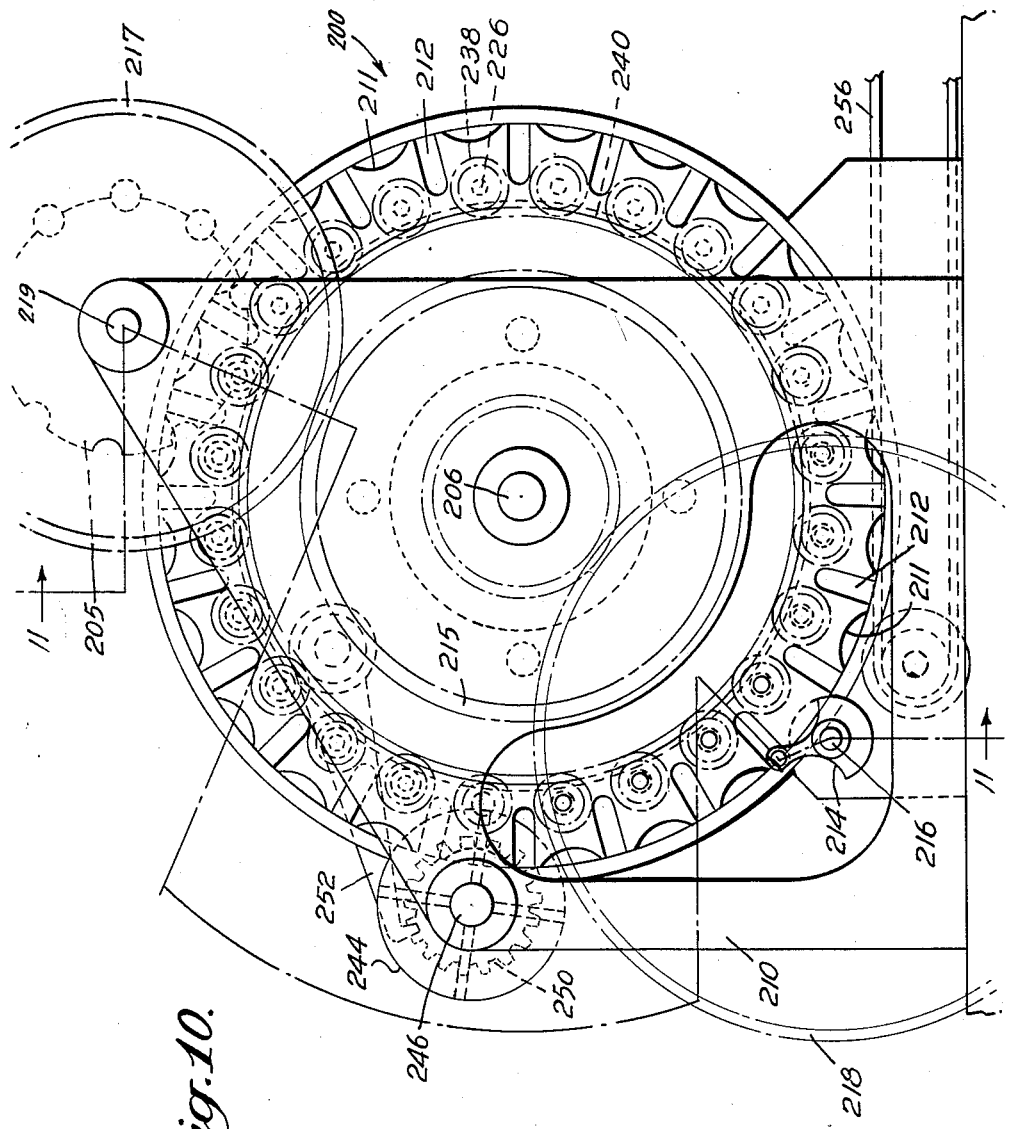

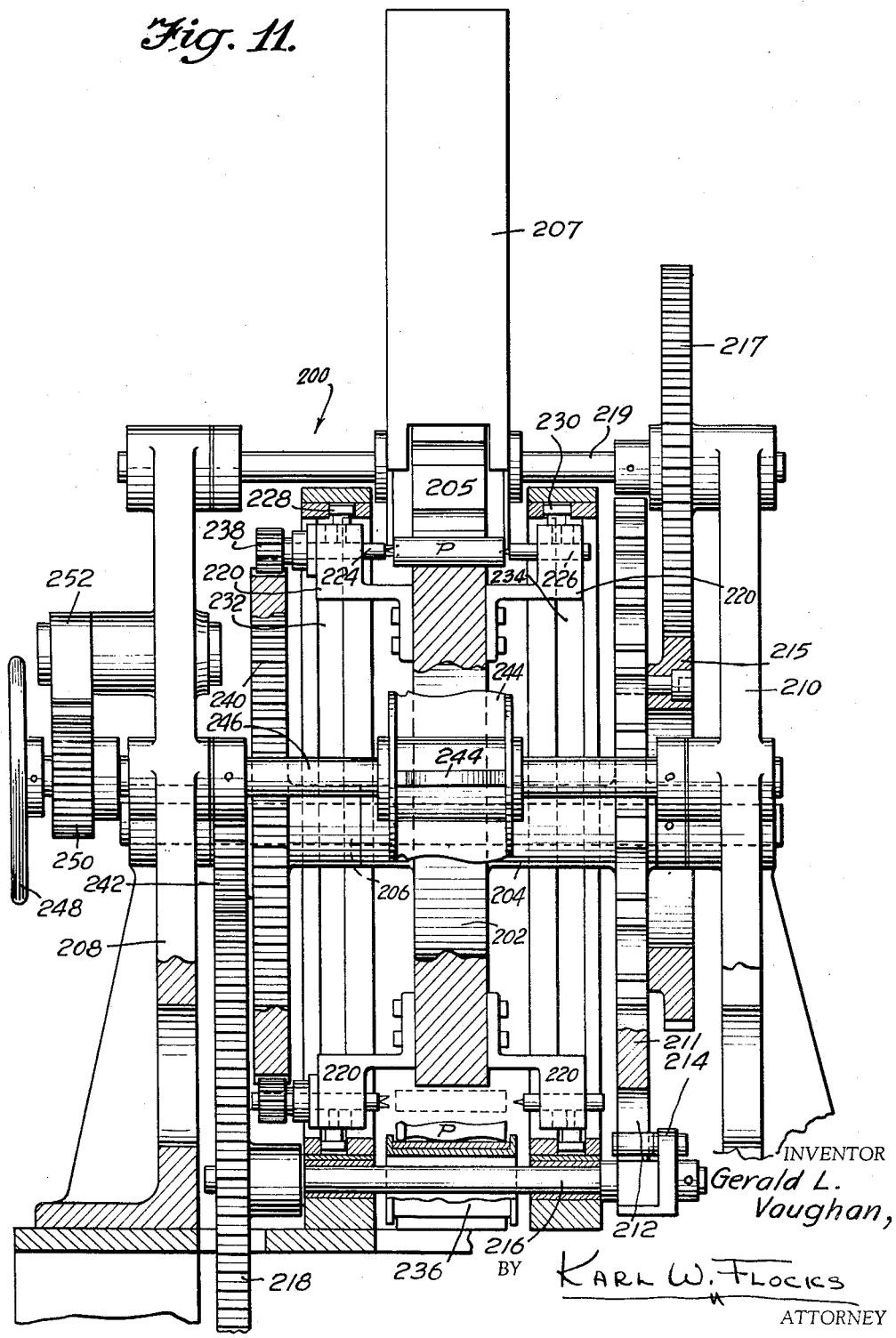

United States Patent Office 2,921,614
Patented Jan. 19, 1960

2,921,614

CONTINUOUS MANUFACTURE OF PROFILED SAW-KERFED WOODEN CLOTHESPINS

Gerald L. Vaughan, Rumford, Maine, assignor to Diamond National Corporation, a corporation of Delaware Application December 9, 1957, Serial No. 701,496

5 Claims. (Cl. 144—9)

This invention relates to making one-piece round clothespins, and more particularly to successively contouring and kerfing a wooden rod or dowel to produce a finished one-piece round clothespin in a continuous operation.

In the prior art relating to apparatus for making round clothespins from wooden dowels, it has frequently been the practice to contour the dowel pin and to slot the dowel to provide the kerf in the clothespin in separate operations on separate machines. While machines are known in the prior art which perform both the contouring and slotting functions upon the dowel pin, these machines are inoperative to produce a properly kerfed pin.

Thus, the clothespin-making machines of the prior art are generally not suitable for mass production of uniformly kerfed one-piece clothespins and generally have operational characteristics, such as discontinuous operation, which renders the machines economically inefficient and add to the manufacturing cost of the clothespins.

Accordingly, it is an object of this invention to provide for improved contouring and slotting of wooden dowel pins to produce round one-piece clothespins in a single continuous operation.

It is another object of this invention to provide a clothespin-making machine including contouring and kerf-slotting components which are structurally related to each other in such manner as to provide greater efficiency of the combined operations.

It is still another object of the invention to provide a continuously moving carrier for carrying the dowell pin past the contouring device, together with means for prolonging the contact time of each pin with the contouring device while the carrier continues to rotate.

Still another object of the invention is to provide a clothespin-making machine including improved means for holding the dowel pin securely and in properly centered relation to the slotting saw while the pin is carried past the slotting saw.

In achievement of these objectives, there is provided in accordance with this invention a clothespin-making machine including a first and a second rotary carrier mounted for rotation about mutually perpendicular axes. The first rotary carrier receives wooden dowel pins from a supply hopper and carries the pins past a rotary cutter which contours the pins to the desired shape. The first rotary carrier supports adjacent its periphery a plurality of pairs of centers, each pair including a driving center and an axially shiftable center. The ends of each pin are gripped between a pair of centers as the pin is carried past the cutting member, and means are provided for frictionally driving the centers as they move past the cutting member.

An important feature of the construction is the radially movable bearing bracket which supports each pair of centers on the first rotary carrier and which is controlled by a cam follower to follow the periphery of the contouring cutter during the contouring operation. This increases the contact time of the pin being contoured with the cutting member to insure a satisfactory contouring operation despite the continuous relatively high speed of rotation of the carrier which supports the pins during the contouring operation.

The second rotary carrier rotates about an axis which is at right angles to the axis of rotation of the first carrier. This unusual arrangement permits a novel and simple lateral feed of the contoured pins from the discharge point of the first carrier to the pick-up point of the second carrier. The second carrier has a plurality of radially extending trough-like pin holders in circumferentially spaced relation to each other which firmly support the dowel pins in properly centered relation as they move past the slotting saw. Cooperating with each trough member is a cam-controlled locking finger which moves into locking engagement with the pin to be slotted after the pin has been picked up by the respective trough. The pin, seated in the trough, and securely clamped by the locking finger, is then rotated by the continuously rotating second carrier past a circular saw which cuts a slot or kerf in the pin.

In the modified embodiment of the invention shown in Figs. 10 and 11, a modified rotary carrier is provided for moving the dowel pins past the contouring cutter. The modified carrier is driven by a Geneva drive mechanism which causes the rotary carrier to dwell or stop momentarily as each dowel pin is being contoured, the rotary carrier then being swiftly moved by the Geneva mechanism until the next successive dowel pin is adjacent the rotary cutter. In the modified embodiment, the centers which support the dowel pins being contoured are not radially movable to prolong contact time with the cutter as in the embodiment of Figs. 1-9, since the dwell provided by the Geneva mechanism is sufficient to permit the cutter to properly contour the dowel pins. The driving centers which support the dowel pins are axially movable in their bearings to move into and out of engagement with the dowel pins at the beginning and end of the cycle under the influence of cam followers carried by the centers which move along stationary cam tracks. One of the centers supporting each of the dowel pins is a driving center and is continuously gear driven during the operation of the machine to rapidly rotate each dowel pin while it moves with the rotary carrier, thereby insuring that the dowel pin is rapidly rotated as it is carried past the cutter member.

Other objects and advantages of the invention will be apparent from the following description taken in conjunction with the accompanying drawings, wherein:

Fig. 6 is an enlarged view in section showing the center members which support the dowel pins on the first rotary conveyor, which carries the pins past the contouring cutter;

Fig. 7 is a view in section along line 7—7 of Fig. 6, showing the details of the camming arrangement for the center members which permit the increased contact period of the dowel pin with the contouring cutter;

Fig. 8 is a wiring diagram showing the electrical circuit for actuating the axially shiftable centers on the carrier which moves the pins past the contouring cutter member;

Fig. 9 is a fragmentary side elevational view showing details of the electrical contact device which actuates the electrically controlled shiftable center;

Fig. 10 is a fragmentary view in side elevation of the modified rotary carrier which carries the dowel pins past the contouring device; and Fig. 11 is a view of the modified rotary carrier taken along line 11—11 of Fig. 10.

Figure 1:
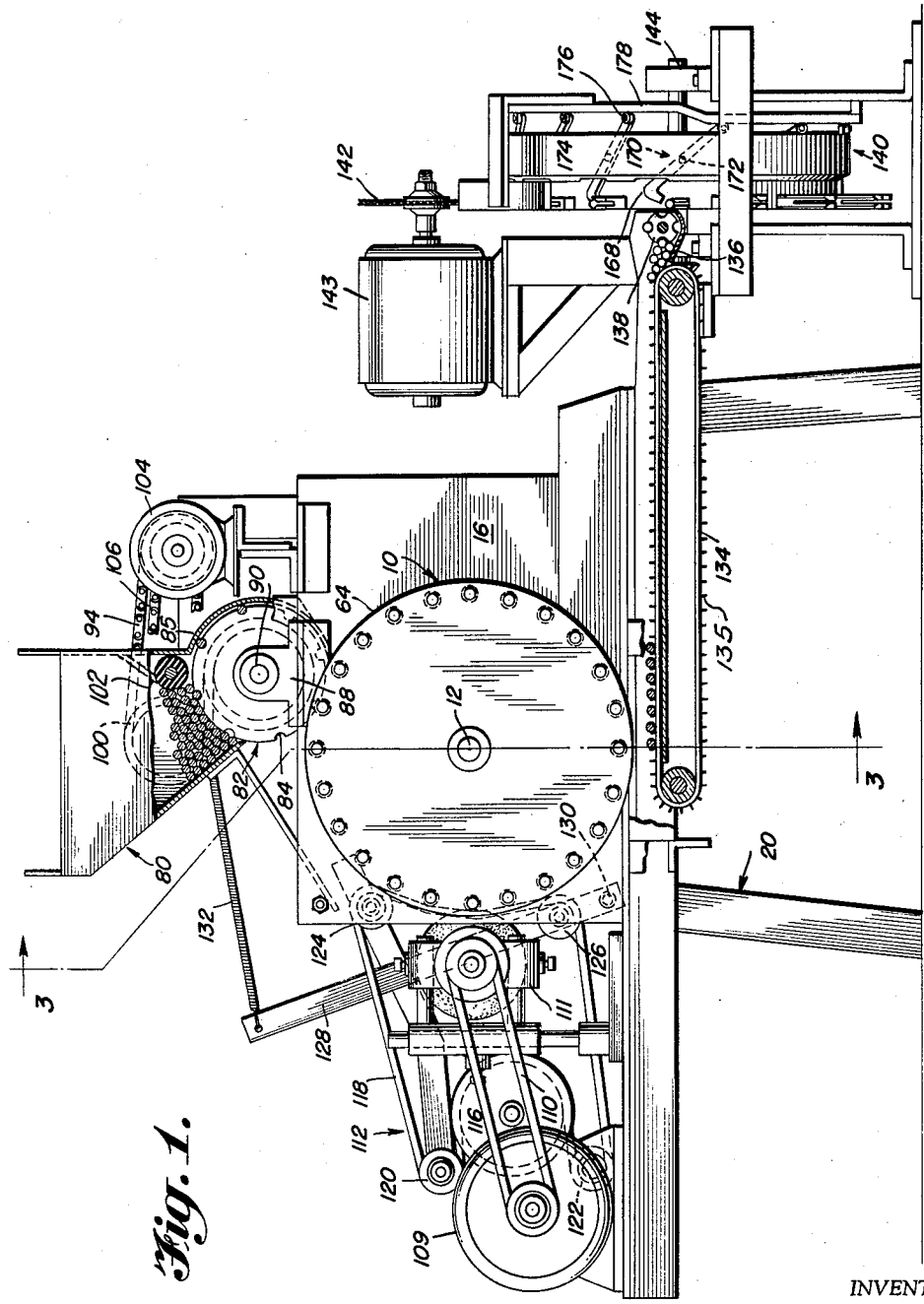
Fig. 1 is a side elevational view of a clothespin-making machine in accordance with the invention.
Figure 2:
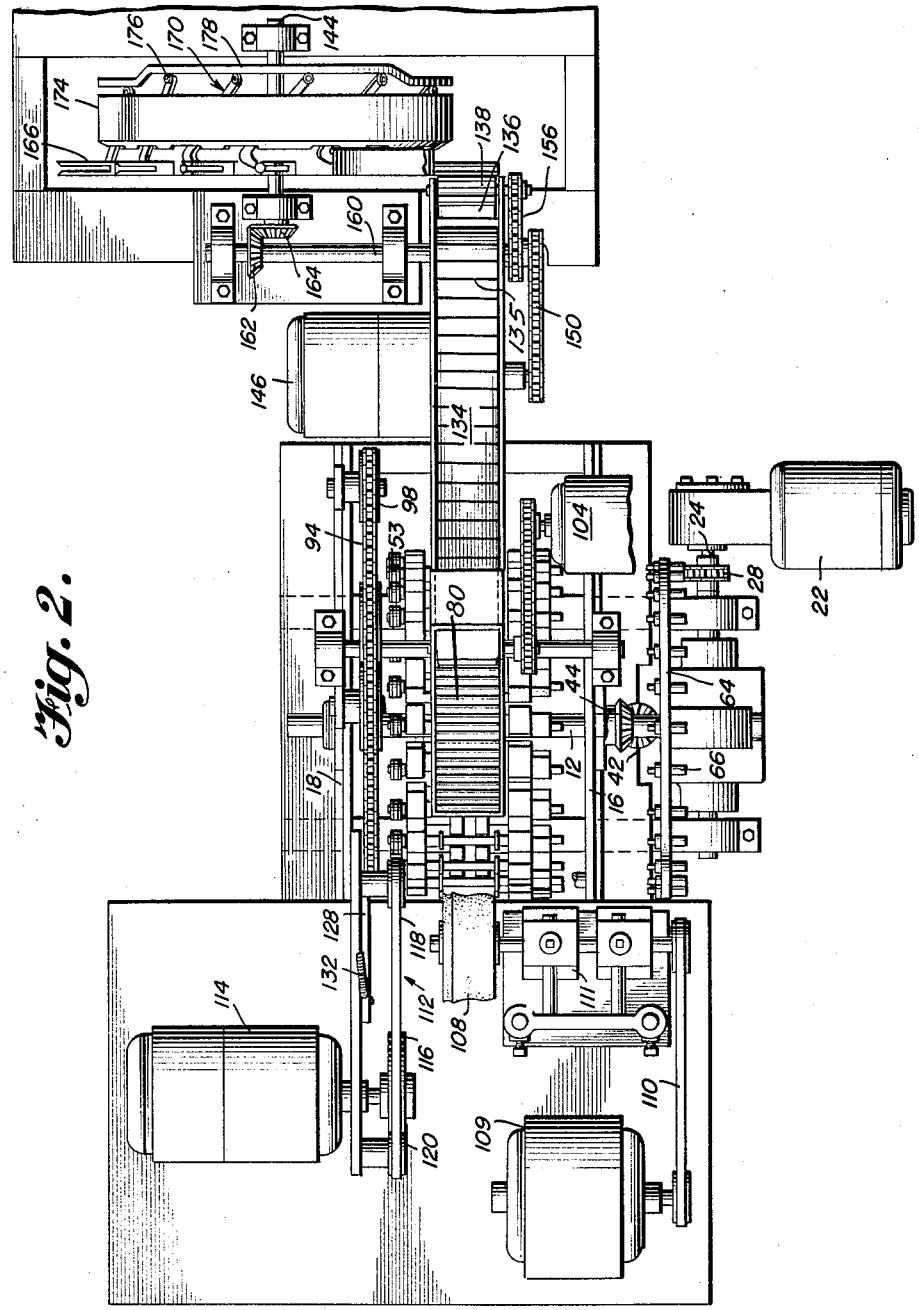
Fig. 2 is a top plan view of the clothespin-making machine of Fig. 1.
Figure 3:
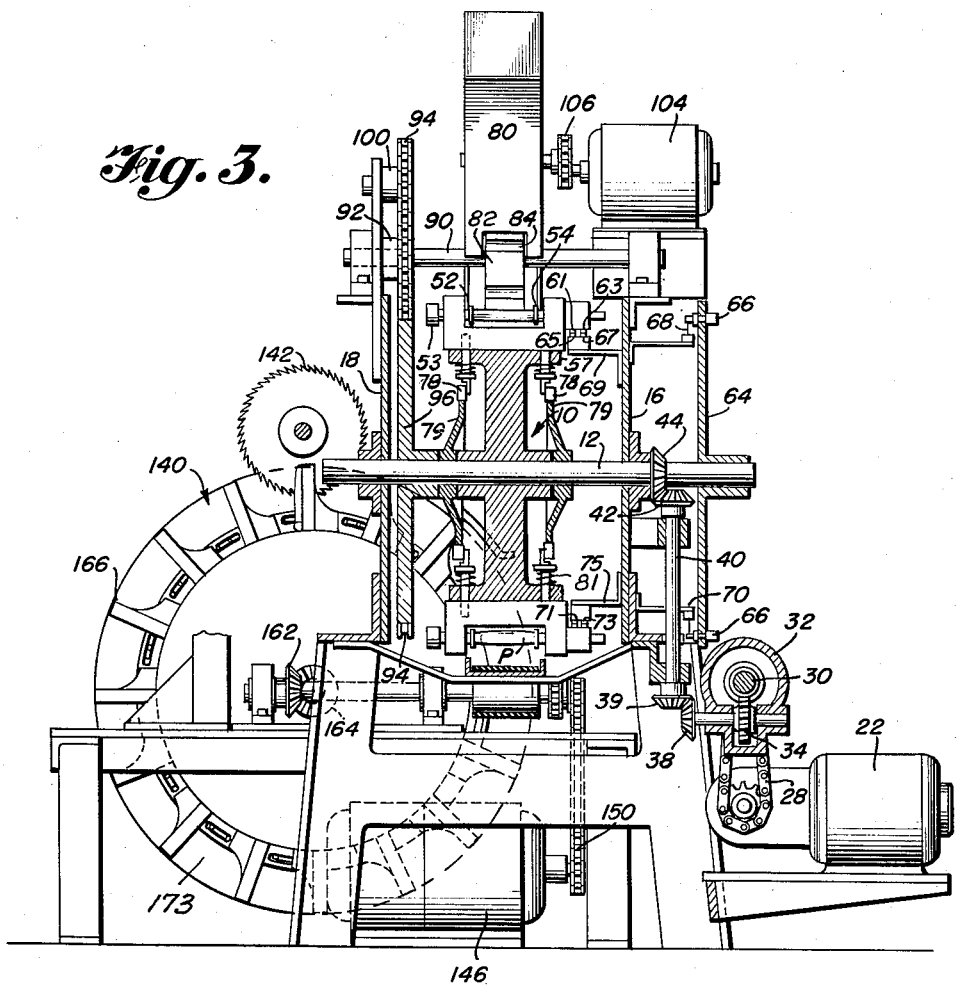
Fig. 3 is a view in transverse section along line 3—3 of Fig. 1.

Referring now to the drawings, and more particularly to Figs. 1, 2, 3 and 5, the clothespin-making machine comprises a drum-like first carrier member generally indicated at 10 rigidly mounted on a shaft 12 which is supported for rotation about a horizontal axis by bearings carried by spaced vertical walls 16 and 18 which form a part of the supporting framework generally indicated at 20. Shaft 12 is continuously rotated during the operation of the apparatus by an electric motor or other suitable prime mover 22. The output shaft 24 of motor 22 is connected in driving relation to shaft 12 through a chain 28 which engages sprocket 26 on shaft 24. Chain 28 drives a worm gear 30 through a clutch 32. Worm gear 30 engages a worm wheel 34 on a horizontal drive shaft 36. The opposite end of shaft 36 adjacent rotary carrier 10 is provided with a bevel gear 38 which mates with a corresponding bevel gear 39 at the lower end of a vertical drive shaft 40. At the upper end of vertical drive shaft 40 is positioned a bevel gear 42 which engages a mating bevel gear 44 in shaft 12 to impart rotary motion to shaft 12.

The dowel pins P to be contoured are respectively supported for rotation at spaced intervals circumferentially around the periphery of rotary carrier member 10 by a pair of centers including a driving center 52 and an axially shiftable center 54, as best seen in Fig. 6 of the drawings. Each driving center 52 carries at its outer end a pulley 53 which is frictionally engaged by a driving means in the vicinity of the contouring cutter, as will be described more fully. Centers 52 and 54 are respectively supported by bearings 74 and 76 carried by oppositely disposed bracket portions 56 and 58 of a bearing bracket generally indicated at 55 mounted on the outer peripheral surface of annular flange 57 at the outer periphery of carrier 10.

The bearing housing 59 for axially shiftable center 54 also houses an electrical solenoid 60 which is suitably energized to retract center 54 in an axially outward direction against the force of a spring 62 to permit dowel pin P to be received between the two centers 52 and 54. When solenoid 60 is deenergized it permits spring 62 to move center 54 into engagement with the end of pin P.

As best seen in Figs. 3, 6, 8 and 9, each solenoid 60 is provided with a pair of wiping contacts 61 and 63 which engage stationary wiping contacts 65 and 67 carried by bracket 69 at the upper portion of the path of rotation of carrier 10 adjacent the point where the pin feed wheel 82 to be described discharges pins P between centers 52 and 54. Similarly stationary wiping contacts 71 and 73 are supported by bracket 75 adjacent the lower end of the path of travel of rotary carrier 10 adjacent the point where the contoured pins are to be discharged from the rotary carrier. One contact of each pair of stationary wiping contacts is connected to one side of electric power. Thus, as shown in the wiring diagram of Fig. 8, stationary wiping contacts 65 and 71 are both connected to the negative power line of a D.C. power supply. The other stationary wiping contact 67 at the upper end of the path of travel of carrier 10 is connected to the positive side of electric power through a microswitch 68 carried by wall 16 adjacent the discharge point of pin feed wheel 82. Similarly, stationary wiping contact 73 at the lower end of the path of travel of carrier 10 is connected to the positive side of the power source through microswitch 70 carried by wall 16 adjacent the discharge point of rotary carrier 10.

A disc 64 is mounted on shaft 12 axially outwardly of rotary carrier 10 and carries adjacent its outer periphery a plurality of circumferentially spaced switch actuating cams 66 which engage microswitches 68 and 70. A switch actuating cam 66 is provided to correspond to each solenoid 60.

Microswitch 68 is so positioned adjacent the upper end of the path of travel of carrier 10 as to complete a circuit through contacts 61, 63, 65 and 67 to energize solenoid 60 and move center 54 at the proper time to permit a dowel pin dispensed from feed wheel 82 to rotary carrier 10 to be received between a pair of centers 52 and 54. Microswitch 70 is so positioned adjacent the lower end of the path of travel of carrier 10 as to complete a circuit through contacts 61, 71, 63, 73 to energize solenoid 60 and retract center 54 to release the contoured pin from carrier 10. The position of switch actuating cams 66 may be made adjustable on disc 64 to permit an adjustment of the timing of the energization of solenoids 60.

Dowel pins P are distributed to rotary carrier 10 from a hopper, generally indicated at 80, disposed above the path of rotation of carrier 10, as best seen in Fig. 1. A feed wheel generally indicated at 82 having circumferentially spaced pin-receiving pockets 84 around its outer periphery, is mounted for rotation through the lower end of hopper 80. The pin feed wheel 82 rotates in a clockwise direction with respect to the view shown in Fig. 1, while rotary carrier 10 rotates in a counterclockwise direction.

Feed wheel 82 is mounted on a shaft 90 supported by bearing brackets 88, shaft 90 also carrying a drive sprocket 92. A drive chain 94 passes around a large drive sprocket 96 fixed to the same shaft 12 which supports rotary carrier 10. Chain 94 passes around idler sprockets 98 and 100 and around sprocket 92 on shaft 90 to drive feed wheel 82 at the same peripheral velocity as rotary carrier 10 so that dowel pins which are picked up by feed wheel 82 from hopper 80 are deposited on rotary carrier 10 in properly timed relation to the rotation of carrier 10.

Hopper 80 is provided with a downward extension 85 (Fig. 1) which conforms to the curvature of pin feed wheel 82 and serves as a guide which retains the pins in pockets 84 of the pin feed wheel until the pins have been picked up by drive center 52 and shiftable center 54 of carrier 10.

In order to prevent jamming of the dowel pins in hopper 80, a rotary agitator 102 is supported for rotation within the lower end of hopper 80 and is driven by a separate motor 104 through a chain 106.

A contouring or profiling cutter 108 is supported for rotation adjacent the periphery of rotating carrier 10 at a point past the location of feed wheel 82. Cutter 108 has a contour similar to that to which the dowel pins are to be contoured. A suitable grinding wheel may be used in place of rotary cutter 108, if desired. Contouring cutter 108 is driven by a separate electric motor 109 through drive belt 110. Cutter 108 is supported on a platform 111 which is vertically and horizontally adjustable with respect to the path of rotation of dowel pins P carried by rotary carrier 10.

An important feature of the construction is the supporting and camming arrangement for bracket 55 which supports centers 52 and 54 to permit the dowel pin P which is being contoured to follow the surface of the contouring cutter 108 while the rotary carrier 10 moves continuously past the contouring cutter.

As best seen in Figs. 6 and 7, the periphery of flange 57 on rotary cutter 10 is defined by a series of connected chord-like sections 72, one chord-like section being provided for each bearing bracket 55 supporting a pair of centers 52—54. The flat radially outer surface of chord-like section 72 provides a firm support for its corresponding bearing bracket. Bearing bracket 55 is attached to a cam follower rod 77 which passes through an aperture in chord 72 on flange 57 of carrier 10. At its radially inner end, cam follower rod 77 carries a roller 78 which rides along a stationary cam track generally indicated at 79. A spring 81 interposed between the radially inner surface of chord 72 on flange 57 and a shoulder 83 carried by rod 77 biases roller 78 continuously into engagement with cam track 79.

As carrier 10 rotates, roller 78 moves along cam track 79. The spacing of cam track 79 from the outer surface of chord 72 on flange 57 is such that bearing bracket 55 normally rests on the outer surface of chord 72. A few degrees of rotation in advance of the point where the path of rotation of a given dowel pin P is tangential to the periphery of the contouring cutter 108, cam roller 78 reaches a high point 84 on cam track 79 which causes cam roller 78 and cam follower rod 77 to move bearing bracket 55 radially outwardly away from chord 72 to cause pin P to be brought into contact with contouring cutter 108. Following engagement with peaked portion 84 of the cam track, cam roller 78 rides along a radially inwardly curved arcuate cam track portion 85 terminating in a second high point 87 a few degrees beyond the normal point of tangency of the path of rotation of pin P with the periphery of contouring cutter 108. Arcuate cam track portion 85 has a curvature such that the pin P being contoured remains in contact with contouring cutter 108 for the angle θ of rotation of carrier 10 corresponding to the arc embraced by arcuate cam track portion 85.

In order to rotate the dowel pins about their own axis during the period in which they are passing rotary cutter 108, a dowel spinning mechanism is provided which will now be described. As previously mentioned, each of the drive centers 52 is provided at its outer end with a pulley wheel 53. The pulley wheels 53 are frictionally driven by a belt drive mechanism generally indicated at 112 when their associated dowel supporting centers reach the vicinity of cutter 108. Belt drive mechanism 112 includes an electric motor 114 which drives a pulley member 116. A belt 118 is trained around four idler pulleys designated at 120, 122, 124 and 126, respectively. Idler pulleys 124 and 126 are positioned adjacent the path of rotation of pulley members 53 carried by drive centers 52 in such manner that the portion of belt 118 passing between pulleys 124 and 126 frictionally engages the drive pulleys 53 of several drive centers approaching and in the immediate region of cutter 108.

In order to assure that there is always sufficient tension on belt 118 to frictionally drive pulleys 53, the lowermost idler pulley 126 adjacent the path of rotation of pulleys 53 is supported on a lever member 128 (Fig. 1) which is pivoted at point 130 adjacent the lower end of lever 128 to a point on stationary framework 20. A spring member 132 is anchored at one end to the upper end of lever 128 and at its opposite end to a suitable stationary point in such manner that lever 128 is constantly biased toward the periphery of rotating carrier 10 with the result that idler pulley 126 is always positioned at a point which provides adequate tension on belt 118.

A horizontally moving conveyor 134 is positioned below the path of rotation of rotary carrier 10 and receives the contoured dowel pins as they are discharged from rotary carrier 10. Conveyor 134 includes a plurality of upstanding lugs or divider members 135 which divide the surface of the conveyor into a plurality of flights, each flight being of sufficient length along the conveyor to receive a single clothes pin. Conveyor 134 is driven from the same drive shaft 160 (Figs. 2 and 5) which drives the second rotary carrier 140 to be described. The discharge of the dowel pins is effected by energization of the solenoid 60 of each axially shiftable center 54 as the respective center reaches the lower end of the path of rotation of carrier 10 directly above conveyor 134. Suitable stripper blades and guides, not shown in the drawings, should be provided to insure proper transfer of the contoured pins from carrier wheel 10 to the conveyor 134. Such stripper blades and guides are particularly important where the pin is being constantly rotated, as in the embodiment of Fig. 11 to be hereinafter described.

The contoured dowel pins are discharged by conveyor 134 onto a chute 136 (Fig. 1) where they are picked up by a feed wheel 138 driven in timed relation to a second rotary carrier, generally indicated at 140, which carries the contoured pins past a circular saw 142, which places a slot or kerf in the contoured pins to thereby complete the formation of the clothespin. Saw 142 is driven by an electric motor 143.

Rotary carrier 140 is a turret-like member carried by a shaft 144 whose axis is perpendicularly arranged to the axis of shaft 12 on which rotary carrier 10 is mounted. Shaft 144, and consequently rotary carrier 140, is rotated by an electric motor 146 having a drive sprocket 148 which drives a chain 150. The opposite end of chain 150 passes around a sprocket on shaft 160. The opposite end of shaft 160 carries a bevel gear 162 which mates with a bevel gear 164 carried by shaft 144, to thereby effect rotation of shaft 144 and rotary carrier 140. Shaft 160 has secured thereto a drive sprocket which drives a second chain 156 passing around a sprocket 158 carried by a shaft 152. Shaft 152 driven by chain 156 drives feed wheel 138 in timed relation to the rotation of carrier 140 in such manner that the contoured clothespins which are to be slotted are delivered to rotary carrier 140 in properly synchronized relation to the rotation of carrier 140.

Carrier 140 has secured to its outer periphery and extending radially therefrom at circumferentially spaced intervals a plurality of pin holders 166 of trough-like shape. Each pin holder 166 includes a recess, preferably of V-shape in cross-section, adapted to receive and hold a contoured dowel pin in radially extending position for engagement with circular saw 142. Cooperating with each of the trough-like pin holders 166 is a locking finger 168 which is adapted to lock or clamp the pin in position after it has been deposited in holder 166 by feed wheel 138. Locking finger 168 is formed as an extension on a lever generally indicated at 170 which is pivotally supported at point 172 by a drum-like axial extension 174 of carrier 140 (see Fig. 4). Each lever 170 terminates in an end portion having a cam follower 176 mounted thereon. A stationary cam track 178 extends circumferentially around the path of rotation of rotary carrier 140 but axially spaced a short distance from the outer end wall of axial extension 174 of carrier 140. Each lever 170 is biased by a spring 171 in a direction which urges locking finger 168 into clamping engagement with trough-like pin holder 166. Cam track 178 is so shaped, as best seen in Fig. 1, as to swing each respective lever 170 in a clockwise direction with respect to the view shown in Fig. 1, shortly before the associated pin holder 166 reaches the vicinity of pin feed wheel 138, to thereby move locking finger 168 away from trough 166 which receives the pin to be slotted. The cam track has a contour which permits lever 170 to move in a counterclockwise direction with respect to the view shown in Fig. 4 under the effect of biasing spring 171 immediately after the pin has been deposited in trough 166 by feed wheel 138. The cam track permits lever 170 to remain in a position under the influence of its biasing spring in which it maintains locking finger 168 in tight clamping engagement with pin P positioned in each trough 166 while the trough and the pin which it carries moves past kerfing saw 142. The shape of the cam track is such as to cause retraction of locking finger 168 from engagement with pin P when rotary carrier 140 reaches a predetermined point adjacent the bottom of its path of rotation after having carried the pins past the kerfing saw 142, to thereby permit the finished clothespins to drop by gravity from rotary conveyor 140 onto a suitable chute or conveyor.

Figure 4:
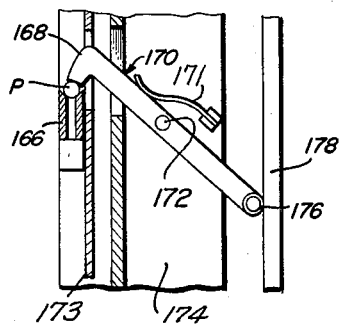
Fig. 4 is an enlarged detail view showing the locking device which secures the pin in a trough of the rotary carrier which conveys the pins past the slotting saw.
Figure 5:
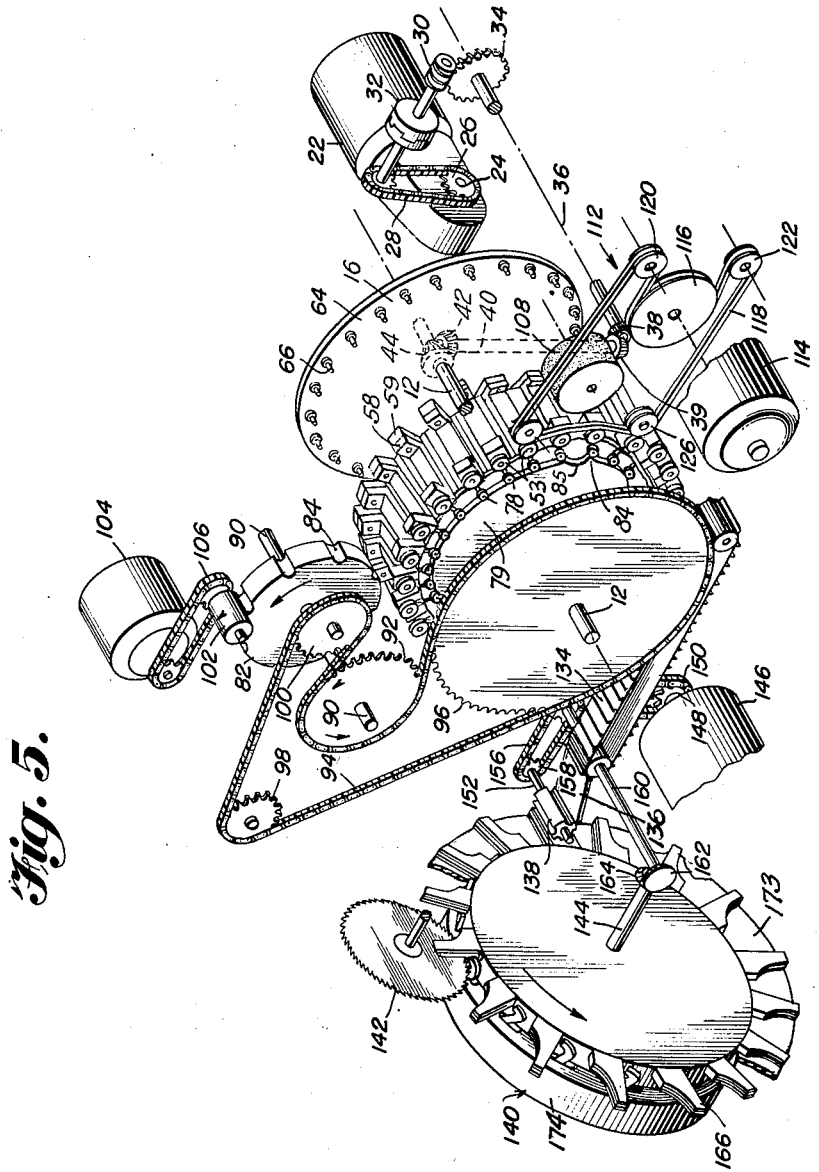
Fig. 5 is a perspective view, partially broken away, showing the major components of the clothespin-making machine.

A back-up plate 173, shown in Figs. 4 and 5, is mounted on carrier 140 on the far side of troughs 166 with respect to feed wheel 138 to prevent the dowel pins which are dispensed to the troughs by feed wheel 138 from moving beyond the troughs instead of falling into the V-shaped recess of each trough when they are being dispensed to the troughs. Plate 173 is omitted from some of the views for the sake of clarity. Back-up plate 173 is provided with apertures to permit locking fingers 170 to extend therethrough into engagement with the dowel pins.

*Summary of operation of embodiment of Figs. 1–9*

The dowel pins which are to be processed into clothespins are positioned in hopper 80 with the axes of the dowel pins positioned substantially parallel to the axis of rotary carrier 10. Pin feed wheel 82 is rotated through the lower end of hopper 80 to pick up dowel pins and deliver them to rotary carrier 10 in timed relation to the rotation of carrier 10. Pin feed wheel 82 is driven by chain 94 driven by drive sprocket 96 on shaft 12 through idler sprockets 98 and 100 and driven sprocket 92 on shaft 90 which carries pin feed wheel 82.

The pins P in hopper 80 are agitated and thereby prevented from jamming by the rotation of agitator wheel 102 disposed within the lower end of the hopper and driven by motor 104 through chain 106.

Rotary conveyor 10 is rotated by electric motor 22 through drive sprocket 26, chain 28, clutch 32, worm gear 30, worm wheel 34, horizontal shaft 36, bevel gear 38 at the end of shaft 36, bevel gear 39 at the lower end of vertical drive shaft 40, bevel gear 42 at the upper end of vertical drive shaft 40, and bevel gear 44 carried by horizontal shaft 12 on which rotary conveyor 10 is mounted.

The rotating pin feed wheel 82 rotates in timed relation to the rotation of rotary carrier 10 and deposits dowel pins to be contoured into position between centers 52 and 54 of rotary carrier 10. Switch actuator disc 64 mounted on shaft 12 carries a plurality of circumferentially spaced switch actuator cams 66 which engage microswitch 68 just before a dowel pin is deposited on rotary carrier 10. The engagement of microswitch 68 by the switch actuating cam 66 corresponding to a given pair of centers 52 and 54 completes a circuit through contacts 61, 63 65, 67 to cause energization of solenoid 60 associated with the given axially shiftable center 54 and retracts center 54 against the biasing effect of spring 62 to permit the pin P to be received between the centers 52 and 54. As soon as the given pair of centers has passed the point wherein the pin is received, as just described, solenoid 60 is de-energized and spring 62 causes center 54 to firmly grip pin P, the pressure of center 54 also causing the opposite center 52 to tightly engage the opposite end of pin P.

The pin which has just been received between the centers 52 and 54 is carried by rotary carrier 10 toward rotary cutter 108 which engages the dowel pin and cuts the pin to the desired contour. Shortly before the pin reaches the region of cutter 108, pulley 53 carried by center 52 is frictionally engaged by drive belt 118 which rapidly rotates center 52 and pin P while the pin is in contact with cutter 108. Belt 118 is driven by motor 114 through drive pulley 116 and idler pulleys 120, 122, 124 and 126. Idler pulley 126 is mounted on a pivoted lever 128 which is biased by spring 132 to constantly tension belt 118, to thereby insure an effective friction drive of center 52 by engagement with belt 118.

The contact time of the dowel pins P being contoured with the cutting tool 108 is prolonged by engagement of cam roller 78 with arcuate cam track portion 85. This causes bearing bracket 55 which supports the centers 52—54 for the dowel pin to follow an arcuate path which maintains the dowel pin P in contact with contouring or cutting tool 108 for an angle of movement of carrier 10 which extends on either side of the normal point of tangency of the path of rotation of carrier 10 with the periphery of contouring tool 108.

After the pin has passed cutting tool 108 and is adjacent the lower end of the path of rotation of rotary carrier 10, the switch actuating cam 66 carried by switch actuating disc 64 and corresponding to the given axially shiftable center 54 actuates microswitch 70 and completes a circuit through contacts 61, 71, 63, 73 to energize solenoid 60 to retract center 54 and permit pin P to drop by gravity from rotary carrier 10 to conveyor 134. Conveyor 134 delivers the contoured pins in parallel relation to each other to a short chute 136 from whence they are picked up by a rotary pin feed wheel 138 which delivers the contoured pins to the troughs 166 of rotary carrier 140. Rotary carrier 140 is driven by motor 146, sprocket 148, chain 150, shaft 160, bevel gear 162 at one end of shaft 160 and mating bevel gear 164 on shaft 144 on which is mounted the second rotary conveyor 140. Pin feed wheel 138 which distributes the contoured pins to troughs 166 of rotary carrier 140 is also driven in timed relation to the rotation of carrier 140 through chain 156.

The contoured pin is deposited by feed wheel 138 into an upwardly open trough-like holder 166 where the pin is held in a radially extending position in properly centered relation for engagement with rotary saw 142. The pins are held tightly clamped in each of the troughs 166 by clamping fingers 168. Clamping fingers 168 are normally biased by spring 171 into clamping position but are cammed out of clamping position in the region of pin feeder wheel 138 by engagement of cam follower 176 mounted on lever 170 with stationary cam track 178 to permit the pin to be received in the trough. The clamping finger returns to clamping position as soon as the trough-like holder 166 has moved past the location of pin feed wheel 138.

Rotary carrier 140 then carries the clamped dowel pin past rotary saw 142 driven by separate electric motor 143 which slots a kerf in the dowel pin. The carrier then conveys the contoured and kerfed pin to a point adjacent the lower end of the path of rotation of rotary carrier 140 where clamping finger 168 is cammed out of clamping engagement with the pin by the engagement of cam follower 176 with cam track 178, to permit the completed pin to drop by gravity from trough 166 of rotary conveyor 140 onto a suitable receiver such as a chute or conveyor.

There is shown in Figs. 10 and 11 a modified rotary carrier generally indicated at 200 which may be used for carrying the dowel pins during the contouring operation in lieu of the rotary carrier shown in the embodiment of Figs. 1–9, inclusive.

The modified carrier 200 includes a circular disc member 202 mounted on a hollow sleeve member 204 which is rigidly secured to and turns with disc 202. Sleeve member 204 is supported for rotation by a shaft member 206 which, in turn, is supported by and fixed with respect to oppositely disposed spaced bracket members 208 and 210, respectively.

Integrally connected to one end of sleeve member 204 is a driven Geneva gear 211 which is in geared engagement with a Geneva driving member 214 mounted on shaft 216. Driven Geneva gear has a number of circumferentially spaced slots 212 which correspond in number and circumferential spacing to the pairs of dowel pin supporting centers mounted on disc 202, as will be described. Shaft 216 carries at its opposite end a spur gear 218 which is in geared engagement with a suitable source of motive power such as an electric motor.

Mounted at circumferentially spaced points about the periphery of disc 202 and extending from opposite surfaces thereof are pairs of laterally projecting bracket members such as those indicated at 220. Each pair of brackets 220, 220 supports a piar of centers 224 and 226, respectively, which, in turn, support the dowel pin P which is to be contoured.

Dowel pins P are supplied to rotary carrier 200 by a pin feed wheel 205 which receives pins from a hopper 207. Pin feed wheel 205 is mounted on a shaft 219 which is driven intermittently in synchronism with the intermittent movement of carrier 200. In order to drive feed wheel 205, a spur gear 215 is rigidly mounted on the outside surface of driven Geneva gear 211 and moves intermittently with gear 211. Gear 215 is in geared engagement with a spur gear 217 carried by shaft 219 on which is mounted pin feed wheel 205. The intermittent movement of driven Geneva gear 211 is thereby transmitted to pin feed wheel 205 through gears 215 and 217.

Each pair of brackets 220, 220 includes a bearing surface which permits axial movement of the respective centers 224, 226 toward or away from the dowel pin P, the bearing surfaces also permitting rotation of the respective centers 224, 226. Each of the centers 224, 226 has slidably mounted thereon a cam follower 228, 230, respectively, which engages the respective stationary cam tracks 232, 234. The shape of the cam tracks 232, 234 is such as to retract centers 224, 226 in an axially outward direction when the centers are adjacent pin dispensing wheel 205 to permit the pin P dispensed from wheel 205 to move into the space between the centers. The shape of the cam tracks is such that centers 224, 226 are moved axially inwardly to engage pin P as soon as the centers move past the loading position and remain in engagement with pin P until the pin reaches the discharge point of the carrier after being contoured. Adjacent the discharge point, the shape of the cam tracks 232, 234 is such as to retract centers 224, 226 to permit the dowel pin to drop onto conveyor 236 which carries the pins to the kerfing portion of the apparatus.

The center 224 of each of the pairs of centers 224, 226 is the driving center which rotates the dowel pin P. Each driving center 224 carries on one end thereof a small spur gear 238 which is driven by a large spur gear 240 loosely mounted for rotation on one end of shaft 206. Spur gear 240 has rigidly attached to the outer surface thereof a smaller spur gear 242 which mates with gear 218 driven by the main power source. The gears 238 carried by the plurality of driving centers are constantly rotated while the machine is in operation since gear 240 is continuously rotated.

A multi-cutter cutting head 244 is positioned adjacent the outer periphery of rotary carrier 200 where it engages dowel pins carried by the respective pairs of centers 224, 226. Cutter head 244 is mounted on a shaft 246 supported for rotation by oppositely disposed bearings carried by bearing brackets 208 and 210. Cutter 244 may be indexed to any one of a plurality of positions to selectively position a desired cutter adjacent the periphery of the rotary carrier 200 by means of a hand wheel 248 mounted at the outer end of shaft 246. A gear-like ratchet member 250 is mounted on shaft 246 adjacent hand wheel 248 and engages a detent or pawl 252 which holds shaft 246 and cutter 244 in any predetermined position to which it may be indexed. Instead of providing a cutter having an indexing arrangement as just described, the cutter may be rigidly mounted on a substantial stationary portion of the supporting framework.

Operation of embodiment of Figs. 10–11

Disc 202 of rotary carrier 200 is driven intermittently past contouring cutter 244 by engagement of driven Geneva gear 211 carried by disc 202 with Geneva drive gear 214 mounted on shaft 215 and driven from an external power source driving gear 218 on shaft 216. In each of its stepped movements, driven Geneva gear 211 advances disc 202 a rotary distance corresponding to the angular spacing between successive pairs of centers 224—226. The Geneva gear drive causes disc 202 to dwell between successive rapid movements, a pair of centers 224, 226 supporting a dowel pin between them stopping adjacent stationary cutter 244 during each dwell period.

Rotary carrier 200 receives the dowel pins which are to be contoured from a pin feed wheel 205 which, in turn, receives the dowel pins from a hopper 207. Feed wheel 205 is driven intermittently by a spur gear 215 carried by the intermittently rotating Geneva gear 212. Spur gear 215 drives a mating spur gear 217 mounted on the shaft 219 which supports pin feed wheel 205 for rotation. Each time that Geneva driven gear 211 advances disc 202 one step to present a new dowel pin to the rotating cutter, pin feed wheel 205 is advanced one step to position another dowel pin between a pair of centers 222, 224.

Each pin P discharged from feed wheel 205 is received between the centers 224, 226 in their retracted position, the centers being retracted when adjacent the pin feed wheel due to the engagement of cam followers 228, 230 carried by the respective centers with stationary cam tracks 232, 234.

The pin-supporting centers 224, 226 are moved by the engagement of their respective cam followers 228, 230 with cam tracks 232, 234 back to a position where they firmly engage the newly received dowel pin as soon as disc 202 is moved by the Geneva drive past the dwell position adjacent the pin feed wheel. The centers then remain in engagement with the dowel pin until the discharge point is reached after the dowel pin has been contoured. The gear 238 carried by each driving center 224 is rapidly and constantly rotated by large gear 240 which is freely rotatable on shaft 206. Gear 240 is driven by power driven gear 218 through gear 242 which is rigid with respect to gear 240. Thus, the centers 224 and 226 are continuously rotated while the machine is in operation to thereby insure that the dowel pin P is rotated as it is carried past cutter head 244.

It can be seen from the foregoing that there is provided in accordance with the embodiment of the invention shown in Figs. 1–9, an improved machine for manufacturing clothespins which permits a rapid and continuous production of the clothespins from the unfinished dowel to the completely contoured and kerfed clothespin in a single continuous uninterrupted operation, ideally suited for mass production of clothespins at a minimum manufacturing cost. The continuous operation of the rotary carrier which supports the pins during the contouring operation in the embodiment of Figs. 1–9 is made feasible by the increased length of contact time of the dowel pin being contoured with the cutting wheel provided by the radial movement of the dowel pin supporting centers with respect to the rotating carrier. While the rotary carrier which carries the dowel pins past the contouring cutter in the modified embodiment of Figs. 10 and 11 is rotated with an intermittent motion, the intermittent driving mechanism, as embodied in the Geneva gearing, permits a very rapid movement of the carrier between successive contouring operations to provide a speed of operation which compares favorably with the embodiment of Figs. 1–9, inclusive. The perpendicular relationship of the rotary conveyor which supports the dowel pins during the contouring operation to the second rotary carrier which supports the pins during the kerfing operation in both embodiments of the invention permits a simple lateral feed of the pins discharged from the first carrier to the pick-up point of the second rotary carrier. Furthermore, the holding and clamping assembly provided on the second carrier rigidly clamps the contoured pin in radially extending and properly centered position within the supporting trough as the pin is carried past the kerfing saw.

It will be obvious to those skilled in the art that various changes may be made without departing from the spirit of the invention and therefore the invention is not limited to what is shown in the drawings and de-

What is claimed is:

1. Clothespin making apparatus comprising; a first rotary carrier mounted for rotation about a horizontal axis, means on said first carrier for supporting and rotating dowel pins with their longitudinal axes parallel to said horizontal axis, contouring means in juxtaposition with said first rotary carrier and radially outwardly of said first rotary carrier for engaging dowel pins supported by said first rotary carrier, conveyor means positioned to receive contoured dowel pins from said first rotary carrier for transporting said pins in a plane parallel to said axis away from said first rotary carrier, a second rotary carrier mounted for rotation about a horizontal axis substantially perpendicular to the axis of rotation of said first carrier, means on said second carrier for clampingly supporting dowel pins with their longitudinal axes extending radially from the axis of rotation of said second carrier during a kerf slotting operation, said second carrier being at the delivery end of said conveyor means, means for transferring dowel pins delivered from said conveyor axially to said dowel pin supporting means on said second carrier, and a kerf slotting means disposed adjacent the path of rotation of said second carrier and engageable with dowel pins supported by said second carrier.

2. The apparatus of claim 1, and further comprising means for supporting said dowel pin supporting means on said first carrier for radial movement, and means for causing said dowel pin supporting means to move radially outwardly as said dowel pin comes into juxtaposition with said contouring means and to then cause the dowel pin axes to move concentrically with said contouring means.

3. Clothespin making apparatus comprising, a rotary carrier, means on said carrier for supporting and rotating dowel pins with their longitudinal axes parallel to the axis of said carrier, contouring means in juxtaposition with said rotary carrier radially outwardly thereof for engaging dowel pins supported by said carrier, means for supporting said dowel pin supporting means on said carrier for radial movement, and means for causing said dowel pin supporting means to move radially outwardly as said dowel pins come into juxtaposition with said contouring means and to then cause the dowel pin axes to move concentrically with said contouring means.

4. Clothespin making apparatus comprising, a rotary carrier, means on said carrier for supporting and rotating dowel pins with their longitudinal axes parallel to the axis of said carrier, contouring means in juxtaposition with said rotary carrier radially outwardly thereof for engaging dowel pins supported by said carrier, means for supporting said dowel pin supporting means on said carrier for radial movement, and means for causing said dowel pin supporting means to move concentrically with said contouring means when in juxtaposition with said contouring means.

5. In clothespin making apparatus, a carrier for dowel pins, means on said carrier for supporting and rotating dowel pins about their axes, contouring means in juxtaposition with said carrier for engaging dowel pins supported by said carrier, and means for causing said dowel pin supporting means to move concentrically with said contouring means when in juxtaposition with said contouring means.

References Cited in the file of this patent

UNITED STATES PATENTS

| | | |
|---|---|---|
| 12,775 | Blake | May 1, 1855 |
| 85,338 | Smith | Dec. 29, 1868 |
| 302,644 | Albee | July 29, 1884 |
| 918,708 | Smith | Apr. 20, 1909 |
| 1,109,948 | Turner | Sept. 8, 1914 |
| 1,200,836 | Hendrick | Oct. 10, 1916 |
| 1,727,513 | Maloon | Sept. 10, 1929 |
| 2,782,816 | Lisherness | Feb. 26, 1957 |